United States Patent Office
2,932,537
Patented Apr. 12, 1960

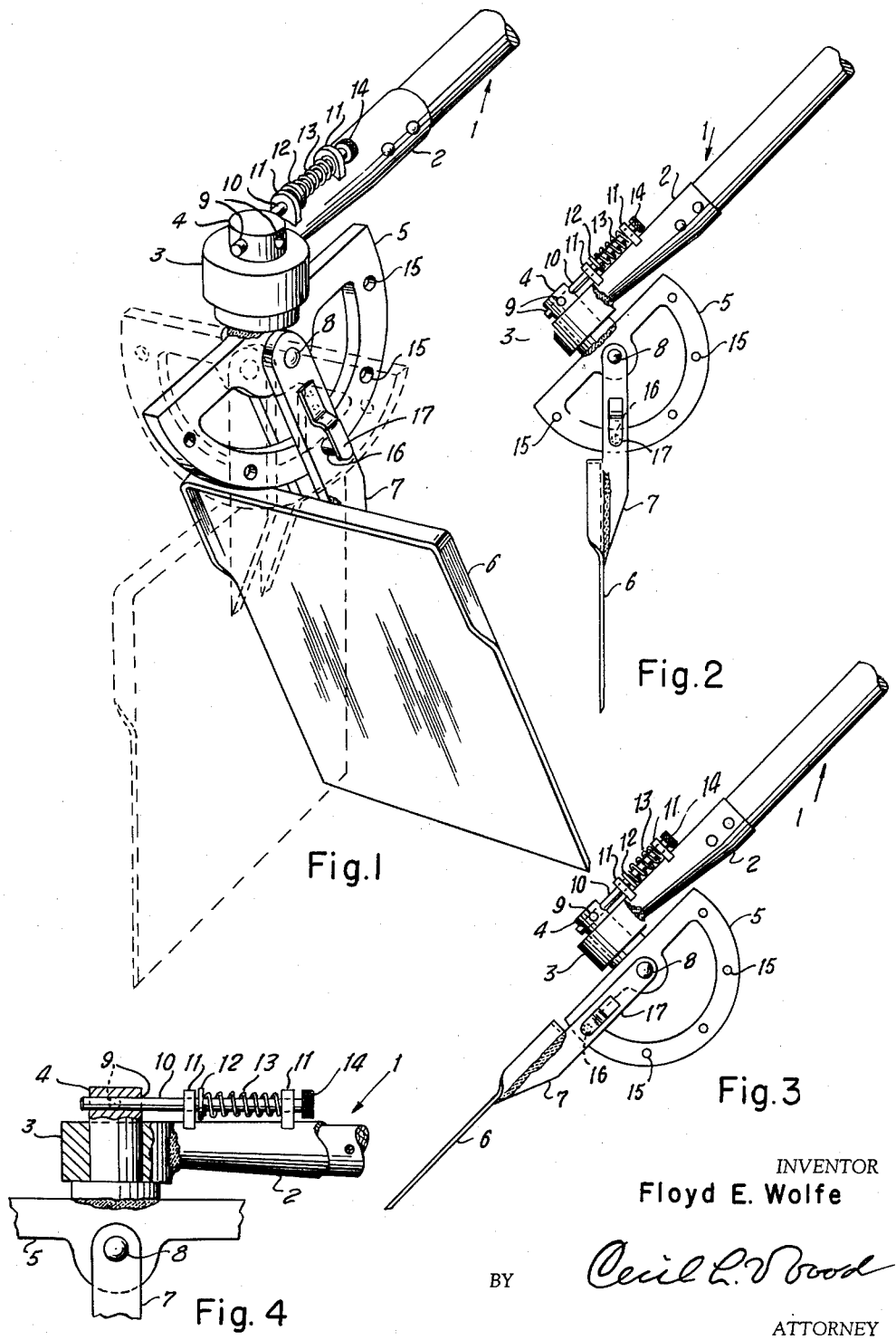

2,932,537

COMBINATION TOOL

Floyd E. Wolfe, Fort Worth, Tex.

Application July 30, 1958, Serial No. 752,104

1 Claim. (Cl. 294—51)

This invention relates to a combination tool, and it concerns more particularly a multiple purpose tool capable of being used selectively as a hoe, a shovel, and an edger.

An object of the invention is to combine, in a single tool, a hoe, a shovel, and an edger.

Another object of the invention is to provide a combined hoe, shovel, and edger comprising an elongated handle, a substantially rectangular blade, and means pivotally and adjustably connecting the blade to one end of the handle whereby the blade is adjustable in two different planes relative to the handle.

Another object of the invention is to provide a combined hoe, shovel, and edger comprising an elongated handle, a substantially rectangular blade having a cutting edge along one of its ends, means pivotally connecting the end of the blade opposite its cutting edge to one end of the handle whereby the blade is movable pivotally in a first plane parallel to the handle while at the same time being movable pivotally in a second plane perpendicular to the handle, means for selectively securing the blade in one of several pivotal positions in the first plane, and separate means for selectively securing the blade in one of several pivotal positions in the second plane.

The invention will be readily understood by referring to the following description and the accompanying drawing, in which:

Figure 1 is a fragmentary perspective view of a combination tool embodying the invention;

Figure 2 is a fragmentary side view showing the tool in one of its adjusted positions;

Figure 3 is a fragmentary side view showing the tool in another of its adjusted positions; and Figure 4 is a fragmentary side view on an enlarged scale, partly broken away.

Referring to the drawing, the combination tool of the invention has an elongated handle 1, which advantageously may be made of wood and has a metal ferrule 2 on one of its ends.

The ferrule 2 is rigidly connected at its outer end to the peripheral surface of a collar 3. A pin 4 is journaled in the collar 3 and extends beyond the ends thereof. The pin 4 is arranged transversely relative to the handle 1, and is rotatable relative thereto.

A semi-circular element 5 has its straight edge rigidly connected intermediate its ends to one end of the pin 4, and is rotatable therewith. The semi-circular element 5 lies in the same plane as the longitudinal axis of the pin 4, and its straight edge is arranged transversely relative thereto.

A substantially rectangular blade 6 has a cutting edge along one of its ends. A pair of flat bars 7, which are arranged in closely spaced, parallel relation to each other, are rigidly connected at one end to the end of the blade 6 opposite its cutting edge. The bars 7 are arranged parallel to the sides of the blade 6, and are positioned on opposite sides of its longitudinal center line.

The ends of the bars 7 opposite the blade 6 are pivotally connected to the semi-circular element 5 at its center by a pin 8, which is inserted through aligned openings provided therefor in the semi-circular element 5 and the bars 7. The bars 7 are arranged parallel to the semi-circular element 5, and are positioned on opposite sides thereof.

A pair of diametrical bores 9, which are positioned at right angles to each other, are formed in the end of the pin 4 opposite the semi-circular member 5. A rod 10, which is arranged parallel to the handle 1 and is reciprocally mounted on the ferrule 2 as hereinafter described, is capable of selectively engaging one of the bores 9 whereby the semi-circular member 5 is arranged either parallel to the handle 1 or at right angles thereto.

The rod 10 is passed through mutually aligned openings provided therefor in a pair of lugs 11, which are attached to one side of the ferrule 2 in spaced apart relation to each other. The adjacent end of the rod 10 is capable of being selectively inserted in one of the diametrical bores 9 upon rotation of the pin 4.

An enlargement 12, which is formed on the rod 10 intermediate its ends and is positioned between the lugs 11, is capable of limiting the longitudinal movement of the rod 10 in either direction by abutment against the lugs 11. A compression spring 13, which surrounds the rod 10, is positioned between the enlargement 12 and the lug 11 farthest from the pin 4, whereby the rod 10 is capable of being biased in engagement with one of the bores 9 by the action of the spring 13.

An enlargement 14, which is formed on the end of the rod 10 opposite the pin 4, is capable of being grasped in the fingers whereby the rod 10 may be retracted relative to the pin 4, against the resistance of the spring 13, to thereby permit the pin 4 to be rotated about its axis.

A plurality of circumferentially spaced openings 15 are formed in the semi-circular element 5, adjacent its arcuate edge, for selective engagement by a pin 16, which is attached to one end of a flat spring 17, the spring 17 being connected at its opposite end to one of the bars 7. The pin 16 is receivable in an opening provided therefor in said one of the bars 7, and is capable of being selectively inserted in one of the openings 15 upon pivotal movement of the bars 7 relative to the semi-circular element.

The invention may be modified in various ways without departing from the spirit and scope thereof.

What is claimed is:

A combined hoe, shovel, and edger comprising an elongated handle, a collar having its peripheral surface rigidly connected to one end of the handle, a pin journaled in the collar and extending beyond the ends thereof, a semi-circular element having its straight edge rigidly connected intermediate its ends to one end of the pin, a substantially rectangular blade having a cutting edge along one of its ends, a bar rigidly connected at one end to the end of the blade opposite its cutting edge, the end of the bar opposite the blade being pivotally connected to the semi-circular element at its center, a pair of diametrical bores, positioned at right angles to each other, being formed in the end of the pin opposite the semi-circular member, a spring biased rod reciprocally mounted on the handle and capable of selectively engaging one of the bores, a plurality of circumferentially spaced openings being formed in the semi-circular element, adjacent its arcuate edge, and a corresponding opening being formed in the bar intermediate its ends, a pin receivable in the bar opening and capable of being selectively inserted in one of the openings of the semi-circular element, and spring means acting on the bar and the last mentioned pin capable of yieldably retaining the pin in the openings.

References Cited in the file of this patent

UNITED STATES PATENTS

| 124,443 | Knight | Mar. 12, 1872 |
| 617,206 | Tveit et al. | Jan. 3, 1899 |
| 987,918 | Schmid et al. | Mar. 28, 1911 |
| 2,463,150 | Camp | Mar. 1, 1949 |

FOREIGN PATENTS

| 607,729 | Great Britain | Sept. 3, 1948 |